Patented June 26, 1923.

1,460,251

UNITED STATES PATENT OFFICE.

GEORGE W. KRAMER, OF CHICAGO, ILLINOIS.

WATERPROOFING COMPOSITION AND METHOD OF MAKING THE SAME.

No Drawing.   Application filed August 31, 1921.   Serial No. 497,382.

*To all whom it may concern:*

Be it known that I, GEORGE W. KRAMER, a citizen of the United States, residing at Chicago, in the county of Cook and State of Illinois, have invented a new and useful Improvement in Waterproofing Compositions and Methods of Making the Same, of which the following is a specification.

This invention relates to improvements in composition of matter and method of making the same, and to a composition of matter more especially adapted for use as a paint or filler to render the surface to which it is applied waterproof. It is adapted for use on pasteboard, cardboard, paper, cement, concrete, stone, masonry, brick, wood, plaster and other surfaces whether porous or not. It fills the pores of any surface to which it is applied, and renders the same waterproof. It also serves to prevent the formation of alkali bloom on cement, concrete, stone and masonry surfaces; and has the effect of removing such alkali bloom from such surfaces when applied. The substance is also substantially transparent which is an advantage since its presence is not readily noticeable; and a covering of it on a surface does not materially alter the original appearance of the surface. It may be applied to colored bricks, colored stones and the like, without substantially covering the color or altering the appearance of the surface to which it is applied. These statements, of course, apply to the composition of matter when made without coloring matter therein. As will be explained more in detail, hereinafter, the composition of matter may also have a coloring matter added to give it a color if desired.

I will now describe in detail the ingredients from which my improved composition of matter is made, and the manner in which they are compounded. In doing this I am giving what I have found to be one successful method of making the composition of matter.

It is obvious however that, without detracting from the spirit of my invention, changes in the proportions of the ingredients and the manner of compounding the same may be made. Also, in all probability, certain components may be omitted entirely, and substitutions of equivalents or substantial equivalents may be made. The particular method which I have found to be successful is as follows: I take six pounds of paraffine and four pounds of red oil (oleic acid), heat them until they melt and then stir them together. I then add ten pounds of thinner, such as turpentine, gasoline and the like, and stir the mixture thoroughly, maintaining just enough heat to keep the composition from solidifying. I then let the temperature drop, but while the composition is still in a liquid state I add about twenty pounds of 3 F. or 4 F. ammonia (26° to 29° Baumé) and stir rapidly for about fifteen minutes. During this stirring the composition turns into a heavy syrup and saponification takes places. I then add water equal to about one-half the volume of the composition and stir the mixture. I then take about five pounds of aluminum sulphate, dissolve the same in water and then add this solution of aluminum sulphate to the mixture and stir the same in. I then add about two pounds of dilute hydrochloric acid. The resulting composition is a white thin fluid resembling milk in appearance, and is apparently an emulsion of paraffine. If it is desired to color the composition any suitable oil soluble color may be added. I have found it preferable to add the coloring just before or just after adding the ammonia.

I do not know exactly what the chemical actions or reactions are which take place in the making of my composition. It seems however that the ammonia with the paraffine and oleic acid causes saponification which effects an emulsification of the melted paraffine. Although in describing a particular method above, I have stated that the thinner, such as turpentine or gasoline, is added before the ammonia; it is obvious that, without detracting from the spirit of this invention, such thinner may be added at other stages in the process. For example, it could be added after the saponification takes place. Likewise, the paraffine or wax could be added after the ammonia. In other words, the ammonia and oleic acid could be mixed to cause saponification, and the paraffine or wax could then be added to this resulting aqueous soap solution, and the mixture heated to melt the wax. After this the aluminum sulphate, or other metal salt, could be added to react on the soap solution to form and precipitate a substantially water insoluble metal soap or metal salt. It would seem also that, without detracting from the spirit of my invention, any other suitable alkali which would effect the desired saponification could be substituted for the ammonia; and that also equivalents for the oleic acid and possibly the paraffine wax could be used which would perform substantially the same functions as these substances. It seems also that the aluminum sulphate forms an insoluble aluminum soap product, probably aluminum oleate, and that, without detracting from the spirit of my invention, any other metal salt which would give substantially the same result could be substituted for the aluminum sulphate. The turpentine acts as a carrier or thinner and assists in making the composition of matter permeate the smallest pores in the surface to which applied. After application the turpentine evaporates leaving the remaining substances hardened. The paraffine dries and hardens and forms the basis of the permanent coat. It is obvious that, without detracting from the spirit of my invention, other waxes and other similar substances may be used in place of the paraffine. The hydrochloric acid is added merely for the purpose of giving a mild acid to assist in removing dirt. It is not at all essential to the composition.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. The method of making a composition of matter which comprises the mixing of wax, oleic acid and turpentine, the saponifying of the mixture, and the addition of water.

2. The method of making a composition of matter which comprises the mixing of wax, oleic acid and turpentine, the saponifying of the mixture, and the addition of a metal salt.

3. The method of making a composition of matter which comprises the mixing of wax, oil and turpentine, the saponifying of the mixture, and the addition of water.

4. The method of making a composition of matter which comprises the mixing of wax, oil and turpentine, the saponifying of the mixture, and the addition of a metal salt.

5. The method of making a composition of matter which comprises the mixing of wax, oil and turpentine, the saponifying of the mixture, and the addition of water and a metal salt.

6. A composition of matter comprising wax, aluminum oleate and turpentine in substantially the proportions stated.

7. The method of making a composition of matter which consists of producing an intimate sub-division of a normally solid water-proofing substance by mixing such substance with a fatty acid, heating the mixture to cause the water-profing substance to melt, adding an alkali to cause saponification of the fatty acid, and adding a metallic salt to produce an insoluble soap.

8. The method of making a composition of matter which consists of producing an intimate sub-division of a normally solid water-proofing substance by mixing such substance with saponifiable oil, heating the mixture to cause the water-proofing substance to melt, adding an alkali to cause saponification, and adding a metallic salt to produce an insoluble soap.

9. The method of making a composition of matter which comprises the mixing of wax and a saponifiable oil, heating the mixture to melt the wax, the saponifying of the saponifiable oil and adding a metallic salt to produce an insoluble soap.

10. The method of making a composition of matter which comprises the mixing of wax and a saponifiable oil, heating the mixture to melt the wax, the saponifying of the saponifiable oil, adding a metallic salt to produce an insoluble soap, and the adding of a thinner.

11. The method of making a composition of matter which comprises the mixing of wax, saponifiable oil and a thinner, the saponifying of the mixture, and the adding of water and a metallic salt.

12. The method of making a composition of matter which comprises the mixing of wax, fatty acid and a thinner, the saponifying of the mixture, and the adding of water and a metallic salt.

13. The method of making a composition of matter which comprises the emulsifying of wax in a soap solution, and reacting on the soap solution with a metallic salt to produce a substantially water insoluble soap.

14. The method of making a composition of matter which comprises the emulsifying of wax in a soap solution, and reacting on the soap solution with a metallic salt to produce a substantially water insoluble soap and adding a thinner.

15. The process of emulsifying a normally solid water-proofing substance by mixing it in a molten state with an aqueous solution of soap, reacting on the soap solution with a metallic salt to produce a substantially water insoluble soap, and allowing it to cool.

16. The process of emulsifying a normally solid water-proofing substance by mixing it in a molten state with an aqueous solution of soap, reacting on the soap solution with a metallic salt to produce a substantially water insoluble soap, allowing it to cool, and adding a thinner.

In witness whereof, I have hereunto set my hand and seal this 1 day of June A. D. 1921.

GEORGE W. KRAMER. [L. S.]